Oct. 29, 1946.  J. SMISKO  2,410,132
LINE PRESSURE VALVE
Filed April 20, 1944
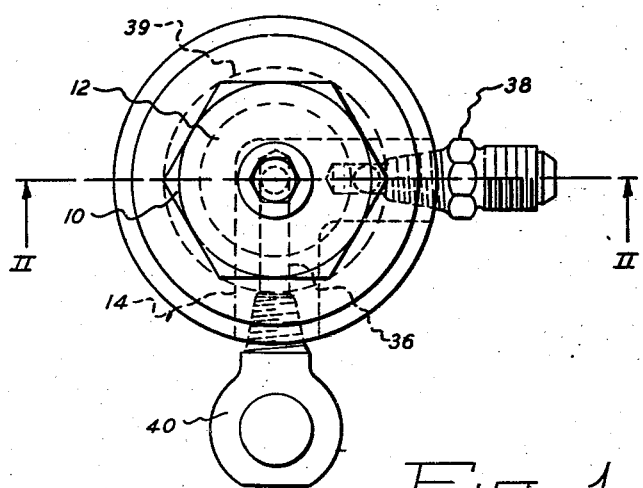
Fig_1.
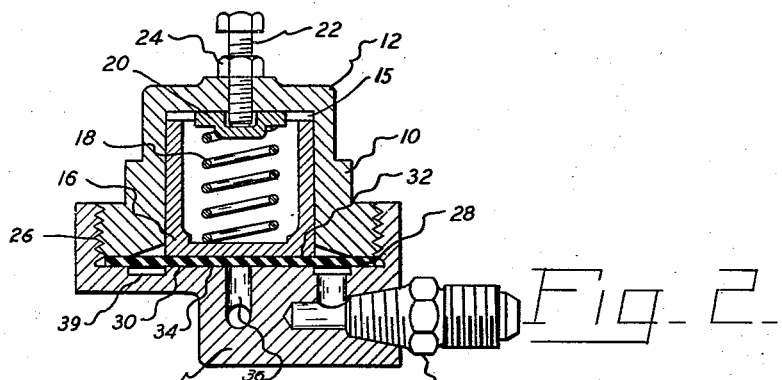
Fig_2.
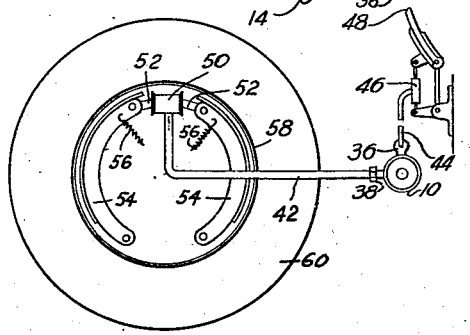
Fig_3.
Inventor
JOHN SMISKO
By Beaman & Langford
Attorneys Patented Oct. 29, 1946

2,410,132

UNITED STATES PATENT OFFICE 2,410,132

LINE PRESSURE VALVE

John Smisko, Washington, D. C., assignor, by mesne assignments, to The B. F. Goodrich Company, Akron, Ohio, a corporation of New York Application April 20, 1944, Serial No. 531,899

2 Claims. (Cl. 188—152)

The present invention relates to improvements in hydraulic brake systems, being specifically concerned with line pressure valve structures used in combination with the retracting means for the brake shoes for controlling the brake shoe clearance and rapidity of brake application and release.

Line pressure valves of the type now in use in hydraulic brake systems are of the poppet construction. In practice it has been found that this type of valve builds up substantial resistance to the return flow of oil from the actuating cylinder on the brake prior to closing and trapping a predetermined fluid pressure in the brakes. The increase in restriction of the fluid returning from the actuating cylinder on the brake unduly prolongs brake release and the retracting action of the brake.

According to the present invention, it is proposed to substitute in lieu of the poppet valve heretofore used in combination with the hydraulic brake system a valve which is characterized by the fact that its movement from fully open to fully closed is exceptionally rapid, notwithstanding the fact that it is pressure actuated, and because of this characteristic materially reduces the time interval during braking application and the reduction of line pressure within the brakes to a predetermined value following brake release. In construction and function the preferred form of valve is characterized by the fact that the preloading of the valve which determines the holding pressure within the brake is counteracted by fluid pressure distributed over a relatively large area with the pressure in the brake in excess of the predetermined holding pressure. As the pressure drops within the brake following brake release, this large area is effective to hold the valve substantially wide open until the pressure has dropped just short of the predetermined holding pressure, at which time the diminishing flow of fluid as the pressure drops effects a sudden redistribution of the pressure within the valve from a relatively large area to a relatively small area, thus accomplishing an acceleration of the valve as the line pressure approaches the predetermined value and provides the desired clearance between the brake shoes and the brake drum.

Thus one of the objects of the present invention is to provide an improved line pressure valve in combination with the retracting means of the hydraulic brake.

Another object is to provide in combination with a hydraulic brake system an improved line pressure valve for reducing the time interval between brake release and the reduction of the holding pressure in the brakes to a predetermined value.

A still further object of the invention is to provide an improved line pressure valve for hydraulic brake systems and the like characterized by a reduction in restriction to flow and accelerated closing at a predetermined pressure.

These and other objects and advantages residing in the present invention, and pertaining to the construction, combination and arrangement of parts will be more fully understood from a consideration of the following specification and annexed claims.

In the drawing, wherein one form of the invention is illustrated in connection with its use in combination with hydraulic brake systems, Fig. 1 is an end elevational view of the valve, Fig. 2 is a cross-sectional view taken on line II—II of Fig. 1, and Fig. 3 is a diagrammatical illustration of the line pressure valve in combination with a hydraulic brake system.

In the illustrated form of the invention, the valve 10 consists of two cast portions 12 and 14. The section 12 has a chamber 15 in which the piston 16 is supported for movement and urged downwardly, as viewed in Fig. 2, by a spring 18 acting against the head of the piston 16 at one end and against the spring seat 20 at the opposite end. The tension of the spring 18 is regulated through an adjustment bolt 22, acting against the spring seat 20 and held in position of adjustment through the lock nut 24.

Cast sections 12 and 14 have threaded engagement at 26, and when tightly screwed together engage with the peripheral portion 28 of the flexible diaphragm 30.

In the illustrated embodiment the end of the piston 16 is shown flat, as at 32, and when in the position shown in Fig. 2 forces the diaphragm 30 against the complementary flat surface 34 of the casting 14 defined between the port 36 and the recess 39 concentric with the port 36 and into which the connection 38 communicates. To facilitate machining, the surfaces 32 and 34 are preferably flat and parallel to each other, but it will be understood that complementary surfaces other than flat may be employed with similar results.

Communicating with the port 36 is a connection 40 through which the valve may be connected to the brake operating cylinder, as shown in Fig. 3, through the line 42. The connection 38 couples the line 44 with the cylinder 46, which may contain a piston actuated from the brake pedal 48 or other conventional structure found in hydraulic brake systems, such as a control valve and the like.

In operation the valve 10 is inserted in the hydraulic system between the brake and the source of operating pressure. As it is well understood in the art, the brake shoe has retracting mechanism usually in the form of springs, which in the case of a radial brake, for example, tend to draw the brake shoe radially inward on brake release to provide clearance between the brake drum and the brake shoe. In a hydraulic brake system this retracting action of the brake shoe functions to force the hydraulic fluid from the operating cylinder or its equivalent back through the line. The clearance between the brake drum and the brake shoe can be controlled by limiting the amount of brake fluid displaced from the brake actuating cylinder. This function is performed by the line pressure valve 10 which may be adjusted to change the tensioning of the spring 18 to close the port 36 to maintain a predetermined pressure within the brake. As the brake shoe wears in service the clearance may be adjusted by increasing the tension of the spring 18 to provide the higher pressure necessary to take up the additional clearance due to wear. The function just described with reference to the valve 10 is similarly performed by line pressure valves now in use of the poppet type.

The improved performance of the valve 10 over the poppet type, in the combination disclosed, is due to its nonrestricting characteristics and accelerating ability as the pressure within the brake approaches the predetermined holding pressure.

For the reason that the brake actuating pressure is substantially greater than the holding pressure, at the time of brake application hydraulic fluid entering the valve 10 through the connection 38 readily displaces the diaphragm 30 and piston 16 from the surface 34 surrounding the port 36, with the result that fluid freely flows through the valve 10 into the brake cylinder 50 through the line 42. The brake cylinder 50 through members 52 urge the brake shoes 54 outwardly against the tension of the retracting springs 56. The brake drum is indicated at 58. Following brake release the high pressure in the brake continues to hold the valve 10 fully open as the hydraulic fluid returns through the line 42 and connection 40, and port 36, into the line 44. In view of the large area of the diaphragm 30 and the piston 16, the pressure within the brake experiences no difficulty in resisting the action of the spring 18 and maintaining the valve 10 fully open with the restriction to flow maintained at a minimum. This condition exists throughout substantially the entire return flow of the hydraulic fluid from the brake even though the pressure in the brake is rapidly dropping and the flow of fluid through the valve 10 is rapidly diminishing. This fully open condition of the valve 10 and lack of restriction will maintain due to the large area subjected to the pressure in the brake until just short of the closing of the valve 10 to maintain the predetermined holding pressure in the brake. The closing action results from the diminishing flow of hydraulic fluid through the valve 10 and the decreasing pressure which permits the surfaces 32 and 34 to approach each other, but still being separated so as to permit the large area to be subjected to the line pressure. The pressure area is reduced to the area of the port 36 and the stress of the spring 18 is more than adequate to maintain the predetermined pressure in the valve parts in the closed position shown in Fig. 2.

Having thus described my invention, what I desire to secure by Letters Patent and claim is:

1. In combination with a hydraulic brake system having brake elements moved relative to each other on brake application and release, retracting means for providing clearance between said elements upon brake release, a brake chamber having a movable wall actuating one of said elements and against which said retracting means reacts, a source of hydraulic pressure, and a conduit extending between said brake chamber and said source through which a hydraulic fluid flows toward the brake chamber upon brake application and in the opposite direction toward said source upon brake release, a line pressure valve for maintaining a predetermined pressure in said chamber to regulate the clearance between said brake elements located in said conduit and characterized by its rapid action reducing the interval between brake release and the reduction to line pressure within the brake to a minimum, comprising a movable valve part of relatively large area, a valve seat for said valve part, a port of relatively small area opening through said seat and communicating with that portion of said conduit extending to said brake chamber, said movable valve part having a face complementary to said seat and imposed over the entire area thereof, means continuously stressing said valve part toward said seat to close said port to confine fluid under pressure in said chamber, said valve part having a large area as compared to the area of said port subjected to hydraulic pressure with said valve part held open by pressure in said brake chamber immediately following brake release, a second port communicating with that portion of said conduit extending to said source, a common chamber into which said ports open, a wall of said common chamber being defined by said valve parts, hydraulic pressure from said source acting against said valve parts to move it from its seat to enable fluid to flow between said ports, said valve part in its closed position having only a relatively small area subjected to the pressure in said brake chamber, whereby following brake release said valve part is fully open except when pressure in said brake chamber has been reduced to the predetermined line pressure at which point the valve part rapidly closes against pressure distributed over only the area of said first port.

2. In combination with a hydraulic brake system having brake elements moved relative to each other on brake application and release, retracting means for providing clearance between said elements upon brake release, a fluid motor actuating one of said elements, a pressure source and a conduit for fluid flow in communication with said fluid motor and said pressure source, a pressure valve in said conduit maintaining a pressure higher than atmospheric between said pressure valve and said fluid motor, said pressure valve having a movable part of relatively large area, a valve seat for said valve part, a port of relatively small area in said valve seat in communication with said fluid motor, said movable valve part having a face complementary to said valve seat, means for stressing said valve part to said seat to maintain pressure in said fluid motor, a chamber circumscribing said seat in communication with said movable valve part, and a port in said circumscribing chamber communicating to said pressure source.

JOHN SMISKO.